(12) United States Patent
Cherdak et al.

(10) Patent No.: US 11,075,441 B2
(45) Date of Patent: Jul. 27, 2021

(54) DEPLOYABLE RADIO UNITS

(71) Applicant: CACI, INC. - FEDERAL, Arlington, VA (US)

(72) Inventors: Brian Cherdak, Fairfax, VA (US); Allen Paul Nichols, Arlington, VA (US); Jonathan F. Mitchell, Arlington, VA (US)

(73) Assignee: CACI, INC.—FEDERAL, Arlington, VA (US)

( * ) Notice: Subject to any disclaimer, the term of this patent is extended or adjusted under 35 U.S.C. 154(b) by 99 days.

(21) Appl. No.: 16/508,212

(22) Filed: Jul. 10, 2019

(65) Prior Publication Data
US 2020/0335852 A1 Oct. 22, 2020

Related U.S. Application Data

(60) Provisional application No. 62/729,328, filed on Sep. 10, 2018.

(51) Int. Cl.
| | |
|---|---|
| *H04B 1/3822* | (2015.01) |
| *H01Q 1/24* | (2006.01) |
| *H01Q 1/00* | (2006.01) |
| *H04B 1/00* | (2006.01) |
| *H04B 1/04* | (2006.01) |

(52) U.S. Cl.
CPC ............ *H01Q 1/241* (2013.01); *H01Q 1/002* (2013.01); *H04B 1/0064* (2013.01); *H04B 1/04* (2013.01); *H04B 2001/0408* (2013.01)

(58) Field of Classification Search
CPC .......... H04B 1/00; H04B 1/1005; H04B 1/10; H04B 1/16; H04B 1/1607; H04B 1/38; H04B 1/3822; H04B 1/3827; H04B 7/04; H04B 7/043
See application file for complete search history.

(56) References Cited

U.S. PATENT DOCUMENTS

| | | | |
|---|---|---|---|
| 2009/0304059 A1 | 12/2009 | Bishop | |
| 2013/0272463 A1 | 10/2013 | Uyehara et al. | |
| 2016/0282396 A1* | 9/2016 | Butler | ............... H02H 3/38 |
| 2017/0110901 A1 | 4/2017 | Amarasekara et al. | |
| 2018/0219587 A1* | 8/2018 | Huo | ............... H04B 1/40 |

FOREIGN PATENT DOCUMENTS

CN 101742675 A 6/2010

\* cited by examiner

*Primary Examiner* — Blane J Jackson
(74) *Attorney, Agent, or Firm* — BakerHostetler (57) ABSTRACT

A radio system can have an antenna interface unit (AIU), a processor controller unit (PCU), and an interface cable. The AIU can be coupled to one or more antennae and can be configured to receive signals and/or convert the signals to digital signals. The PCU can be coupled to the AIU. The PCU can be configured to receive the analog signals via the interface cable, which can be configured to convey signals according to Wi-Fi, Ethernet, and RF protocols. The interface cable can be configured to provide power from the PCU to the AIU. The PCU can include a contactor controller for protecting against reverse polarity DC power connection.

19 Claims, 11 Drawing Sheets

DEPLOYABLE RADIO UNITS

CLAIM OF PRIORITY

This application claims priority to U.S. Provisional Patent Application No. 62/729,328, filed Sep. 10, 2018, which is incorporated by reference in its entirety.

TECHNICAL FIELD

The present invention relates to apparatus, systems, and methods for radio systems in general, and to deployable radio systems in particular.

BACKGROUND

Radio systems can be utilized in various environments and theaters. Radio systems for detection and mitigation of small unmanned aerial vehicles (UAVs) have become increasingly important. Unmanned aerial vehicles (UAVs)—termed small unmanned aircraft systems (sUASs) by the U.S. Department of Defense and the Federal Aviation Administration, and commonly called drones—have proliferated in recent years. Inadvertent or unlawful misuse of UAS poses an escalating threat to public safety. Particular safety challenges can include sUASs intruding into restricted airspace around high-value assets such as airports, buildings, critical national infrastructure, and stadiums, as well as hindering military and first responder activities.

SkyTracker® is a suite of sophisticated counter-small unmanned aircraft systems (C-sUAS), offered by CACI, an industry leader in developing, deploying, and integrating systems of this nature. The SkyTracker suite is comprised of different form factors of C-sUAS designed to exploit the radio communication between sUASs and their controller. CACI's integrated system-of-systems approach, combined with precision detection, location, identification, tracking, and mitigation techniques, has for many years provided solutions necessary to counter evolving sUAS threats and to protect the warfighter, critical national security assets and infrastructure, as well as the national airspace. For example, the SkyTracker suite includes CORIAN™, a C-sUAS which provides the warfighter fixed site force protection against sUAS threats.

SUMMARY

The present invention is generally directed to apparatus, systems, and methods for radio units, including an embodiment that is a software-defined radio (SDR) that provides the warfighter on-the-move force protection against hostile sUAS. The SDR embodiment precisely detects, locates, identifies, tracks and defeats hostile sUAS and locates the sUAS operator while the SDR operator is on-the-move. The SDR can be ruggedized and efficiently deployed for use in various weight-, power- and space-constrained, mobile platforms, including in ships, HUMVEEs, and sport utility vehicles (SUVs) that can operate under harsh environmental conditions and can provide maritime and ground convoy protection. These features can be achieved, advantageously, by selectively miniaturizing functionalities, and through multi-function components, such as a single interface cable between units that can be used to provide power, as well as convey signals according to multiple different protocols.

An aspect of the invention can include a radio system. The radio system can include an antenna interface unit (AIU), a processor controller unit (PCU), and an interface cable that can connect the AIU and the PCU. In one embodiment the system automatically calculates the length of the interface cable and then adjusts the amplification of the signal enabling the system to operate in an optimized way for both receive and transmit. The combining of Wi-Fi, Ethernet, power, and analog radio frequency (RF) signal transport across a single physical interface cable avoids set-up and operational issues with having to transport, route, and maintain cables of different types and lengths, as well as simplifying the set-up and operation of the system. The AIU can be coupled to one or more antennae, can be configured to receive and transmit signals, and can condition and filter the RF signals. The PCU can be coupled to the AIU. The PCU can be configured to receive conditioned analog signals from the AIU via the interface cable and digitize them for processing. The PCU can also be configured to send signals to the AIU via the interface cable for additional conditioning, amplification and over-the-air transmission. The interface cable can be configured to convey signals according to Wi-Fi, Ethernet, and RF protocols—as well as power—which enables the system to operate using one cable rather than three. The interface cable can provide power from the PCU to the AIU. The PCU can include a contactor controller for protecting against a reverse-polarity direct current (DC) electrical connection, which protects the system from damage if it is incorrectly connected to a DC power source.

In some embodiments, an AIU can include a high band RF controller unit and/or a low band RF controller unit. The AIU can include one or more transmission power amps.

In yet other embodiments, the contactor controller can include a high voltage regulator. The contactor controller can include a reverse-biased diode.

Other aspects, embodiments, and features will be apparent from the following description, the drawings, and the claims.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

A detailed explanation of the system, method, and exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

Although inventions are discussed herein primarily with application to sUAS, as such inventions can be advantageously employed to detect, identity, locate, track and defeat hostile sUAS and locate the sUAS operator, it should be understood by persons having ordinary skill in the art that various aspects can be utilized in other contexts. For example, noise reduction techniques and systems disclosed can be advantageously utilized in any electromagnetic receiver and/or transmitter.

Reliable solutions are disclosed herein that can increase public safety while supporting the rights of responsible operators to fly sUAS. Systems herein can embody fixed site, on-the-move, and small form factor C-sUAS technologies. Fixed site system employment can provide protection against small unmanned aircraft system threats to warfighters and critical infrastructure. The systems can detect, identify, locate, track, and defeat sUAS threats, for example by using precision neutralization techniques to ensure little to no collateral damage to the surrounding RF spectrum and existing communications. The systems can accurately locate both sUAS and their operators.

With user-centered interfaces, a suite of systems can scale from backpackable configurations to large installations. Small form factor, packable advanced electronic attack systems can be utilized to defeat small, complex unmanned aircraft systems. Such systems can be deployable from backpacks and/or luggage, yet include advanced electronic attack systems with long range capabilities. Such systems can survey local environments, which can enable deployed personnel to counter sUAS and digital or analog video signals. The systems can operate autonomously to deliver distributed attacks and provide rapid, responsive force protection capability in hostile environments. On-the-move systems can provide force and/or facility protection against hostile sUAS. Ruggedized, mobile platforms can utilize embodiments to precisely detect, identify, locate, track and defeat sUAS threats. Such systems can be easily deployed on a vehicle or marine vessel, providing for example both ground and maritime convoy protection.

Embodiments can include electronic warfare systems that can employ effects to defeat adversarial surveillance and reconnaissance, cellular communications, Wi-Fi, command and control systems, and sUAS. Embodiments can utilize passive detection capabilities to create, for example, an electronic perimeter boundary around sensitive locations, which can be superior to geofencing. For example, they can provide continuous, automated monitoring, day and night, and operate in all weather conditions. Certain embodiments can include modular subsystems, which can protect high-value assets in geographically compact locations, such as surrounding government buildings, embassies, arenas, and stadiums. Modular embodiments can be particularly scalable to provide wide-area defense of airports, military bases, and areas under temporary flight bans such as locations experiencing forest fires.

Embodiments can be utilized to detect, locate, and track UAS, as well as for mitigating UAS. Systems and methods can be utilized to extract data and/or video streams from communications between UAS and their controller units.

Figure 1:
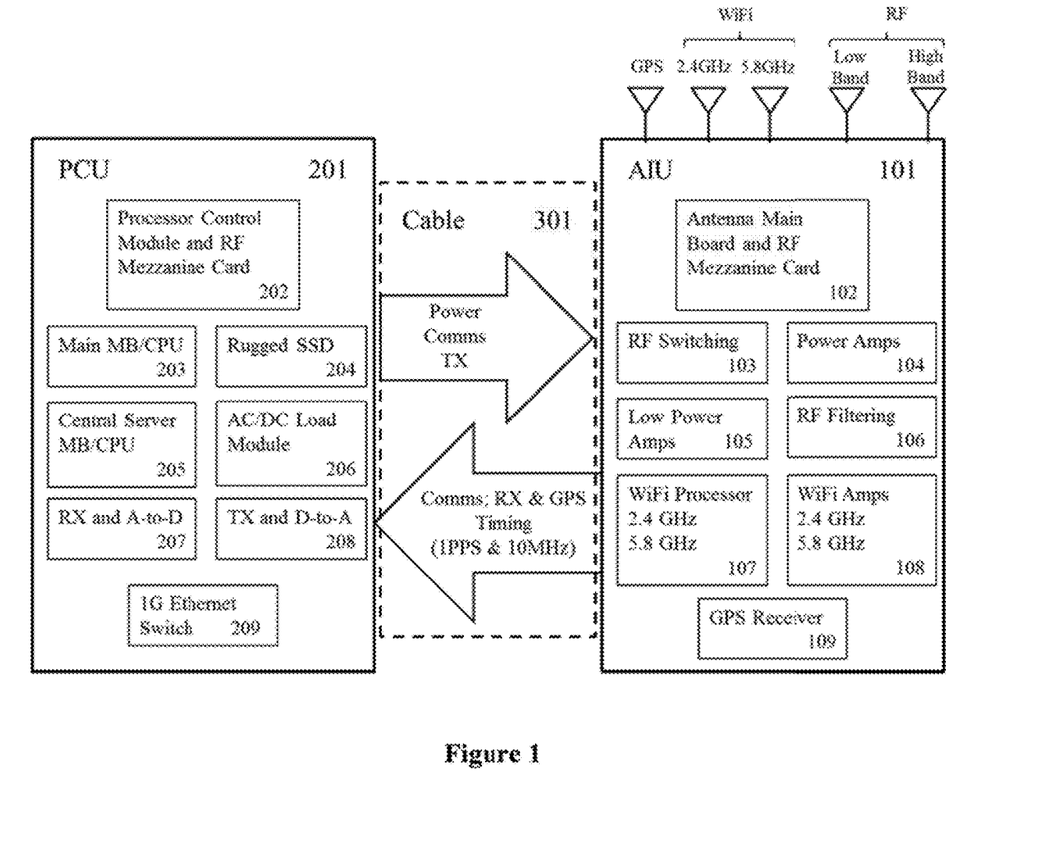
FIG. 1 illustrates an exemplary architecture of a radio system.

FIG. 1 is a top-level block diagram of one of many possible system architectures contemplated. The system can include an antenna interface unit (AIU, 101), a processor control unit (PCU, 201), and an interface cable (301). A PCU (201) can include a processor control module and RF mezzanine card (202), a main motherboard having a central processing unit (203), and rugged solid state drive (SSD) storage (204). The PCU can be in communication with a central server, or as shown in FIG. 1, the PCU can further include a server motherboard and processors (205). The PCU can further include subsystems for signal reception and analog-to-digital conversion (207), for digital-to-analog conversion (208) and transmission, and one or more Ethernet switches (209).

The PCU (201) can be connected to an AIU (101) via an interface cable (301). The cable can convey power, communications, and signals for transmission to and from the PCU to the AIU. The cable can also convey communication, received transmissions and GPS signals, and 1 pulse per second (PPS) timing signals from the AIU to the PCU. The 1 PPS signals can be used to reset internal counters in the data acquisition (DAQ) systems, as well as for other uses as described herein.

The AIU can be communicatively connected to antennae. For example, in the embodiment illustrated in FIG. 1, the AIU is connected to a high band RF antenna and a low band RF antenna. The AIU is also connected to a GPS antenna and two Wi-Fi antennae, specifically 2.4 GHz and 5.8 GHz Wi-Fi antennae.

The various techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere herein. Various computer-based systems, methods, and implementations in accordance with the described technology are presented below.

In an embodiment, detecting, identifying, locating, tracking, and or defeating hostile sCUAS and locating the sCUAS operator can be performed by functions directed by programs stored in a computer-readable medium. That is, the embodiments can include hardware (such as circuits, processors, memory, antennae, dishes, user and/or hardware interfaces, etc.) and/or software (such as computer-program products that include computer-useable instructions embodied on one or more non-transitory, computer-readable media).

Computers and/or servers herein can include one or more central processing units (CPUs) for executing instructions in response to commands, and communication devices for sending and receiving data. One example of the communication device can be a modem. Other examples include an antenna, a transceiver, a router, a dish, a communication card, a satellite dish, a microwave system, a network adapter, and/or other mechanisms capable of transmitting and/or receiving data, whether wired or wireless. Computer and/or servers can also include input/output interfaces that enable wired and/or wireless connection to various peripheral devices. In one implementation, a processor-based system of the computer can include a main memory, preferably random access memory (RAM), or alternatively read-only memory (ROM), and can also include a secondary memory, which can be any tangible computer-readable media. Tangible computer-readable medium memory can include, for example, a hard disk drive and/or removable storage drives, flash-based storage systems and/or solid-state drives, floppy disk drives, magnetic tape drives, optical disk drives (e.g. Blu-Ray, DVD, CD drive), magnetic tapes, standalone RAM disks, etc. The removable storage drive can read from or write to a removable storage medium. A removable storage medium can include a floppy disk, magnetic tape, optical disk, a memory card, etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as those found in video game devices), a removable memory chip (such as an EPROM or flash memory) and associated socket, and other removable storage units and interfaces, which allow software and data to be transferred from the removable storage unit to the computer system.

A system can be embodied by a computer and/or a server and can have an internal and/or external memory for storing data and programs such as an operating system (e.g., DOS, Windows 2000™, Windows XP™, Windows NT™, OS/2, UNIX, Linux, Xbox OS, Orbis OS, FreeBSD, Mac OS X (e.g., Panther, Tiger, Leopard, Snow Leopard, Lion, Mavericks, High Sierra, Mojave, etc.)) and/or one or more application programs. Application programs for certain platforms can include, for example, integrated environments that utilize a plurality of software tools and/or computer languages, such as MATLAB, Simulink, MIDAS, X-Midas, and NeXtMidas. In a preferred embodiment, a system includes a portable, networked, interactive environment with real-time signal processing and analysis. Systems can be implemented by a computer or a server through tools of a particular software development kit (SDK). Examples of application programs include computer programs implementing the techniques described herein for lyric and multimedia customization, authoring applications (e.g., editors, word processing programs, database programs, spreadsheet programs, or graphics programs) capable of generating text and/or comma separated values (CSV) files, documents, or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the computer. Application programs can be externally stored in or performed by one or more device(s) external to the computer.

Various signal processing can be performed by processors, rather than by special-purpose hardware. For example, embodiments can include one or more hardware and/or software defined radios (SDRs). An SDR can include a computer having one or more processors, sound cards, an analog-to-digital converter, a digital-to-analog converter, DAQ, and/or an RF front end. An advantage of utilizing an SDR can be its ability to receive and transmit according to different radio protocols and/or waveforms based on the configuration of the software. An SDR can handle a plurality of the different protocols in real time. Although preferred embodiments can include an SDR, signal detection and analysis can advantageously be handled in part or in whole by an AIU, separately from a PCU.

A system can receive, transmit, and process signals, such as RF signals. Antennae of such system can detect RF emissions from target sUAS and/or controllers communicating with the sUAS. The antenna systems can utilize single or multiband operation. In a preferred embodiment, the system can communicate with sUAS in the spectral range of 30 MHz-6 GHz. Nevertheless, the RF signals can be low frequency (LF, e.g. 30-300 kHz), medium frequency (MF, e.g. 300 kHz-3 MHz), high frequency (HP, e.g. 3-30 MHz), very high frequency (VHF, e.g. 30-300 MHz), ultra high frequency (UHF, e.g. 300 MHz-3 GHz), super high frequency (SHF, e.g. 3-30 GHz), extremely high frequency (EHF, e.g. 30-300 GHz), and/or tremendously high frequency (THF, e.g. 300 GHz-3 THz), also called terahertz radiation. A system can utilize various communication protocols. For example, a system can utilize analog modulation, such as amplitude modulation (AM), frequency modulation (FM), phase modulation (PM), quadrature amplitude modulation (QAM), space modulation (SM), single-sideband modulation (SSB), and/or single-sideband suppressed-carrier modulation (SSB). A system can additionally or alternatively utilize digital modulation, such as amplitude-shift keying (ASK), amplitude and phase-shift keying (APSK), continuous phase modulation (CPM), frequency-shift keying (FSK), multiple frequency shift keying (MFSK), minimum-shift keying (MSK), on-off keying (OOK), pulse-position modulation (PPM), phase-shift keying (PSK), and/or quadrature amplitude modulation (QAM).

Figure 2:
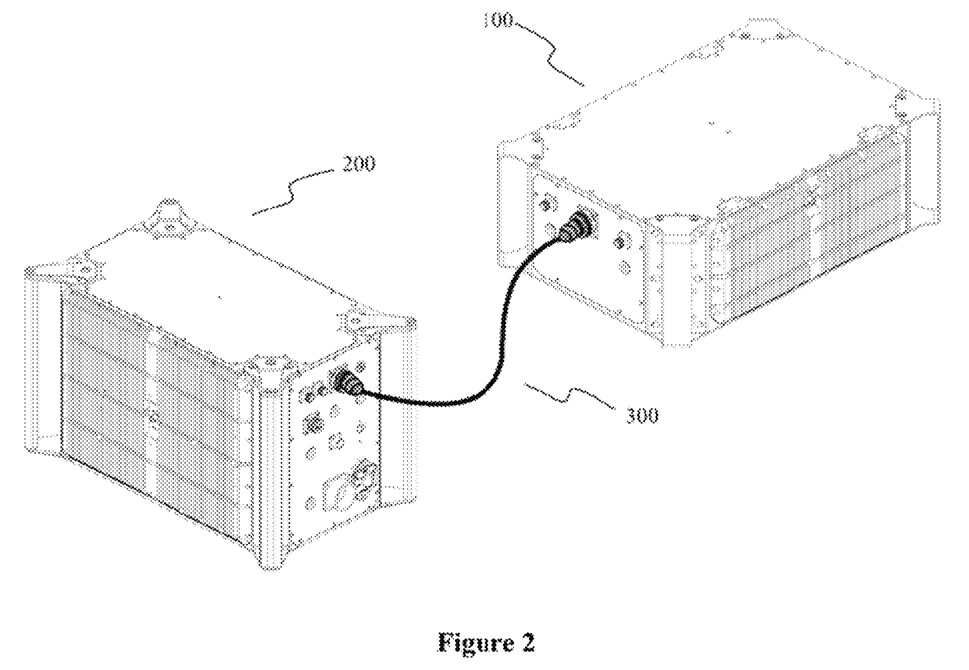
FIG. 2 illustrates a perspective view of a radio system.

FIG. 2 illustrates one of many possible system configurations contemplated. The system can include an antenna interface unit (AIU, 100), a processor control unit (PCU, 200), and an interface cable (300). The AIU and PCU can be interconnected via an interface cable. It will be appreciated that the PCU can be connected to a plurality of AIUs, which can be accomplished by a person exercising only ordinary skill in the art. A preferred embodiment can include a PCU, and AIU, and one or more antennae. As further described herein, the interface cable can be of various lengths to facilitate on-site configuration of the system. For example, the interface cable can be a meter or two, or the interface cable can be several tens of meters. In a preferred embodiment, the interface cable can be up to about 30 meters. In one embodiment the system automatically calculates the length of the interface cable and then adjusts the amplification of the signal enabling the system to operate in an optimized way for both receive and transmit. In another embodiment the interface cable can combine Wi-Fi, Ethernet, power, and analog RF signal transport across a single physical interface cable, which enables the system to operate using one cable rather than three, avoids set-up and operational issues with having to transport, route, and maintain cables of different types and lengths, as well as simplifying the set-up and operation of the system. Although not shown in FIG. 1, the AIU can be connected to antennae, which are herein further described.

The PCU and AIU can each include indicator and status lights, power inputs for alternating current (AC) and/or direct current (DC), and DC and/or AC circuit breakers and switches. The PCU can be turned on and off via power switch. The PCU can supply power to the AIU, for example via a high-voltage DC loop (270 VDC). Alternatively, the AIU can include a separate power switch. The PCU and AIU can each include one or more cooling vents and/or fans. The vents also, or alternatively, can include screens and/or filters, such as high-flow, replaceable filter cartridges. The PCU and AIU can each include heat pipes and heat sinks obviating the need for fans. The interface panels can each include a cable or multi-cable interface connection or interconnect, as well as other ports.

Figure 3:
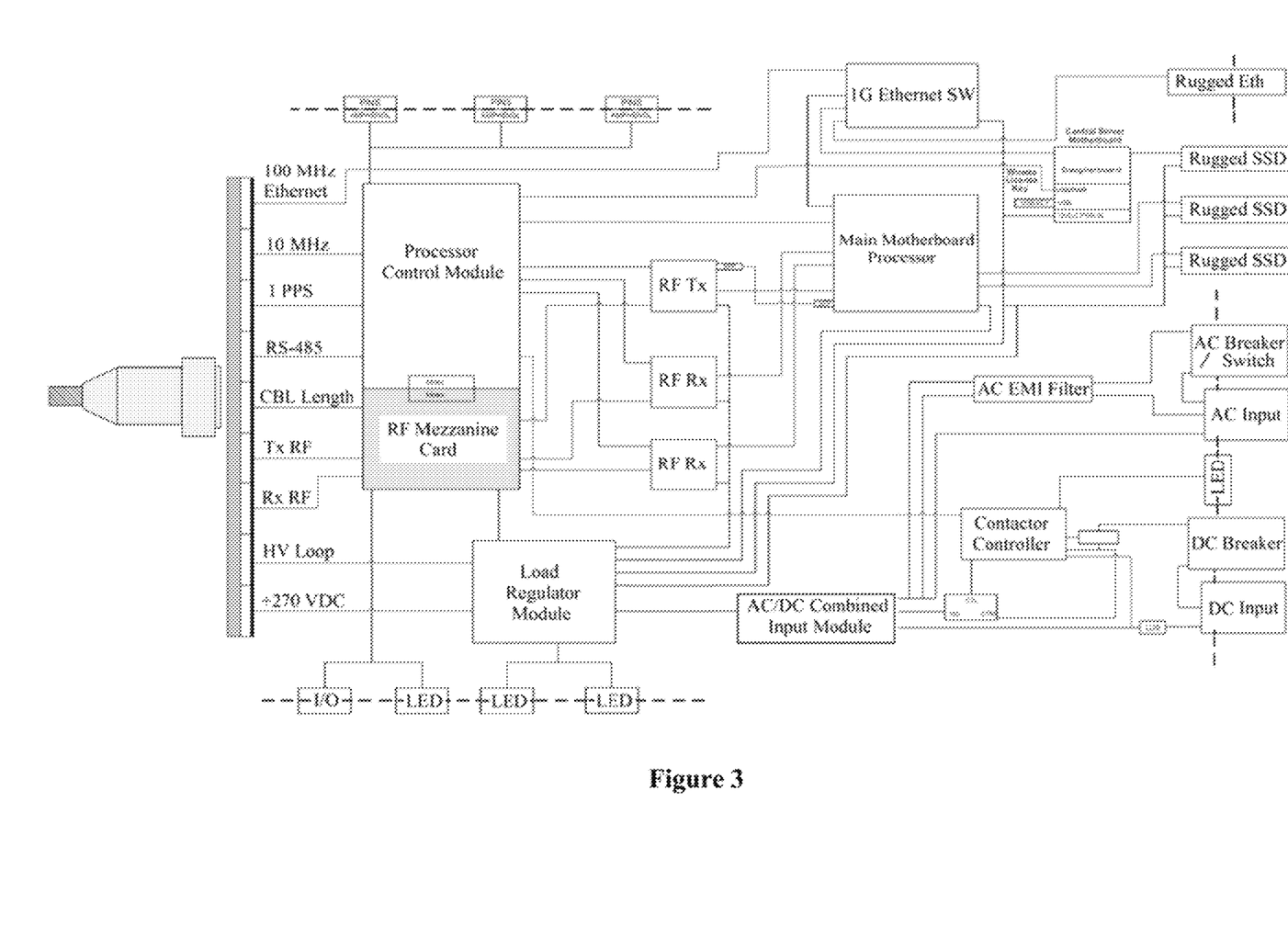
FIG. 3 illustrates an exemplary schematic of a processor controller unit.

FIG. 3 illustrates an exemplary implementation of a PCU. This embodiment can include various external connections, such as DC outputs for fans, an AC circuit breaker, and AC input connector, a chassis ground lug, a reverse polarity fault indicator light emitting diodes (LED), a DC circuit breaker, a DC input connector, indicator lights (DC power, AC power, and status), and a power switch. The PCU can include an interface cable port having, for example, a 100 MHz Ethernet terminal, a 10 MHz terminal, a GPS PPS terminal, an RS-485 terminal, a length resistor terminal, an RF transmission terminal, an RF receiver terminal, a high voltage loop terminal, and a 270 volt (DC) terminal.

The PCU can further include a load regulator module, a power switch (I/O) and status LEDs, an AC/DC combined input module, an Ethernet controller, a main motherboard with CPUs, and/or a plurality of SSD storage components. The PCU can include a processor control module. The PCU can include inputs for AC power and DC power, as well as componentry, such as breakers and contactors, for switching between AC and DC power. Status LEDs can be connected to AC and DC breakers and/or switches. The processor control module can be connected to one or more RF transmitter modules and one or more RF receiver modules as well as AC electromagnetic interference (EMI) filters. RF componentry can be sensitive to switches between power sources. A particular advantage of embodiments can be found in unique, low-noise power supply switching mechanisms. To reduce interference from other componentry, the PCU processor control module can include a raised mezzanine card for isolating RF componentry.

Figure 4:
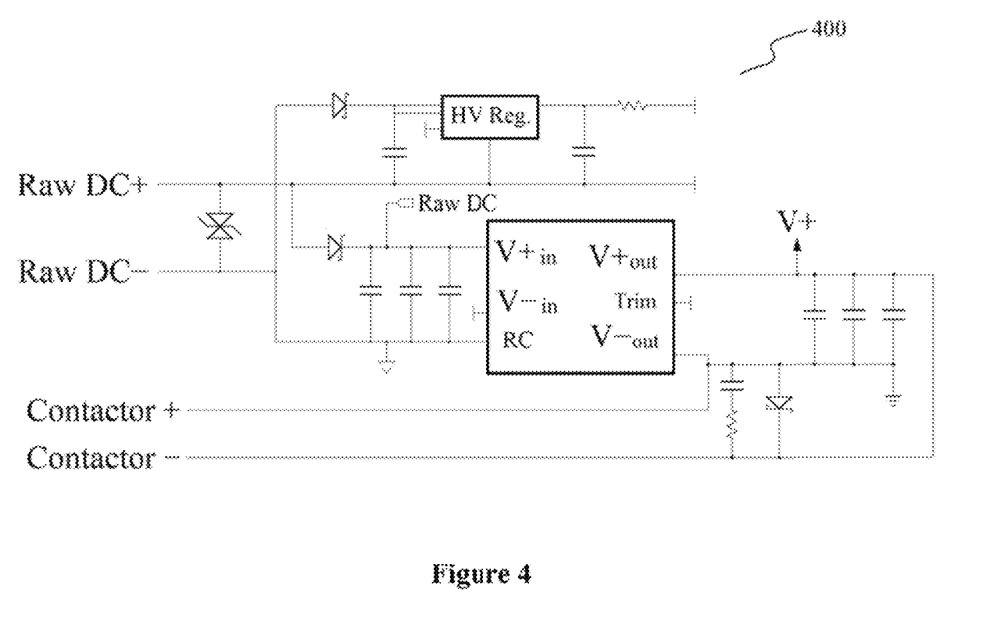
FIG. 4 illustrates an exemplary schematic of a contactor controller.

FIG. 4 illustrates one exemplary contactor controller (400). The ability of the system to switch between AC and DC can be accomplished via a series of diodes and/or by setting the output voltage of an AC/DC and DC/DC converter. The contactor controller can provide reverse polarity voltage protection and indication. This can advantageously protect the system, for example against accidental reverse-polarity DC connections on the power input to the PCU. A contactor controller can also provide indication, for example via an LED indicator, when a reverse polarity connection has been made. The contactor controller can include one or more integrated circuits and a plurality of passive and active electronic components. A reversed-biased diode (a Zenner diode as shown, for example, in FIG. 4) can be utilized as part of an LC circuit between the positive and negative contacts of the contactor controller can ensure voltage regulation. The contactor controller can further include a high voltage regulator and an integrated circuit for regulating voltage. A second diode can be utilized between the positive voltage (raw voltage) and the integrated circuit. A variety of capacitors can be bridged across the positive voltage in (i.e. high and low raw voltage) and the positive and negative of the voltage out.

Figure 5:
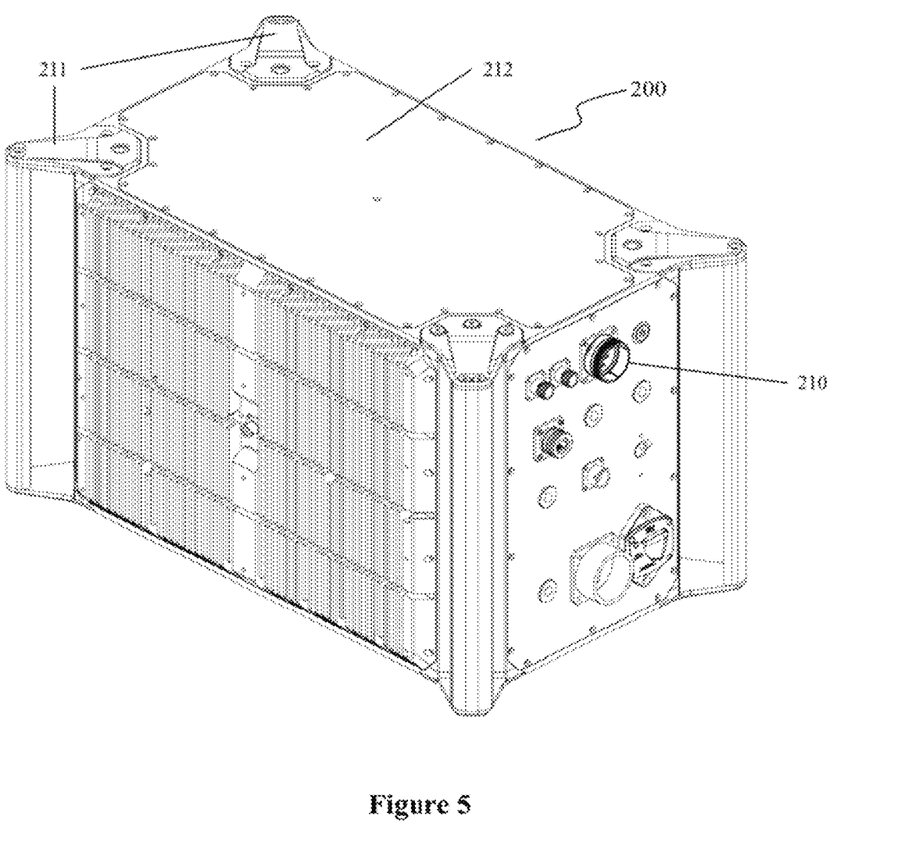
FIG. 5 illustrates a perspective view of a processor control unit.
Figure 6:
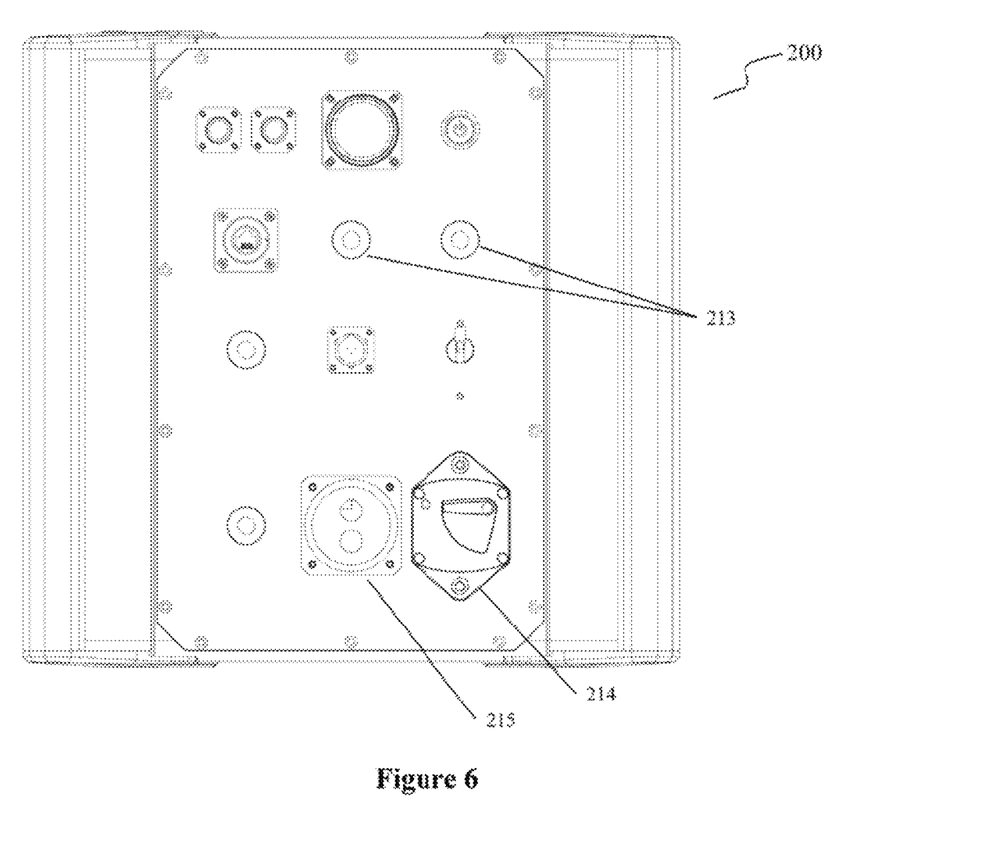
FIG. 6 illustrates an interface panel of a processor control unit.

FIGS. 5 and 6 illustrate a PCU. The PCU can include a top plate (212) and a bottom plate (not shown). Like the AIU, the PCU can include protective protrusions (211) at each of its four corners. FIG. 6 illustrates exemplary details of an interface panel of a PCU. The PCU interface panel can be configured according to user preference and/or specific applications and/or requirements. The interface panel can include interface port (213) for connecting to an AIU. For example, the PCU can include various jacks, status indicator lights (214), a circuit breaker (215) for switching between AC and DC power, and a power inlet (216). The lights can be general system indicators and/or indicators associated with configurable ports. Interface ports can be multi-pin ports, axial ports, and/or multi-axial ports. Other port types can be included according to mission needs and/or user preference. The PCU can include a power switch or toggle (217). One or more power switches can be included on the PCU to energize the PCU and/or to provide power to an AIU.

Figure 7:
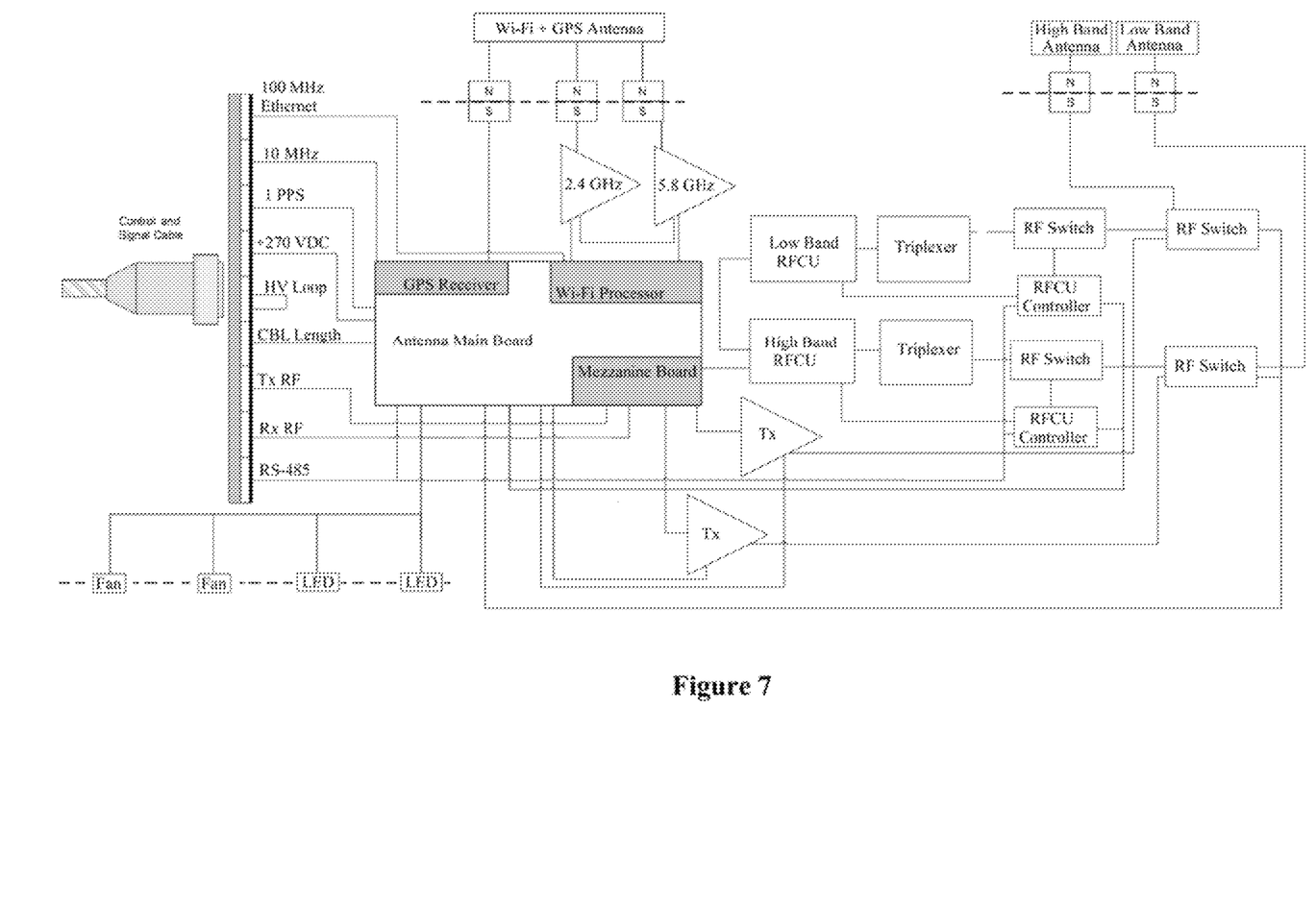
FIG. 7 illustrates an exemplary schematic of an antenna interface unit.

FIG. 7 illustrates an exemplary embodiment of an AIU. As shown, the interface cable interconnect can include various communications cable, include a 100 MHz Ethernet connection, a 10 MHz connection, a 1 pulse per second connection for GPS, a 270 volt supply, a high voltage loop, a length resistor connection for determining cable length, an RF transmission connection, an RF receiver connection, and an RS-485 connection. The AIU can include an antenna main board having GPS and Wi-Fi chips, as well as a mezzanine board for RF componentry. The antenna main board can include connections to a Wi-Fi (2.4 and 5.8 GHz) and GPS antenna. The AIU can include low and high band radio frequency conditioning units (RFCUs) as well as triplexers, RF switches, and controller units. The AIU can be coupled to high and low band antennae. The AIU can include various op amps, such as for 2.4 and 5.8 GHz Wi-Fi and for transmitters and or transceivers. The main board can also operate various peripherals, such as fans and status lights (LEDs).

A system can utilize timing from GPS signals to perform, for example TDOA, FDOA, and RF triangulation of UAS and their controllers. Some embodiments can include RF conditioning to allow highly sensitive detection. Some aspects can include high band and low band filtering to exclude signals outside of known UAS. In addition, some aspects can perform RF conditioning and/or amplification of filtered signals. In some embodiments, an omnidirectional antenna can implement higher area coverage for both reception and transmission by filtering unwanted portions of the electromagnetic (EM) spectrum and amplifying ranges of interest.

Embodiments can be utilized for detecting, identifying, locating, and tracking the sUAS and locating the operators of sUAS. Other embodiments can be utilized for both detecting and defeating the sUAS. Systems generally include one or more detection antennae. Such antennae can be installed in various configurations. Embodiments can identify multiple UAS simultaneously and can distinguish among a group of sUAS. The system can perform signal processing. In some embodiments, front-end processing can be performed in the AIU. In other embodiments, such processing can be performed by the PCU. Front-end processing can include amplification, filtering, down-conversion, A/D conversion, and other radio functionality.

Figure 8:
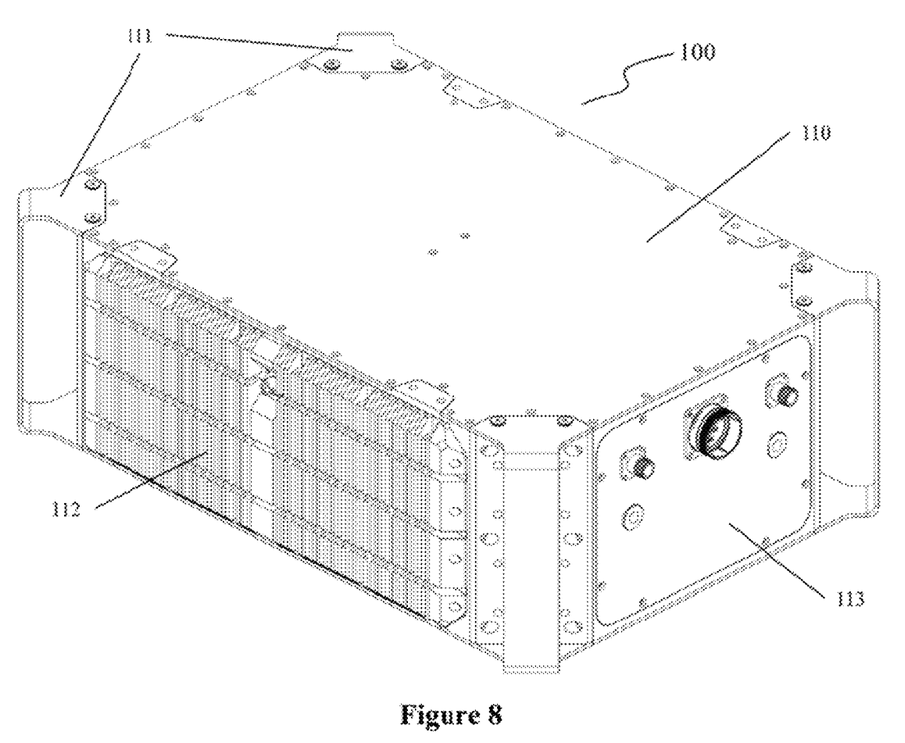
FIG. 8 illustrates a perspective view of an antenna interface unit.

FIG. 8 illustrates an AIU. The AIU can include a top plate (110) and a bottom plate (not shown), as well as protective protrusions (111) at each of its four corners. The protrusions can provide protection for the body of the AIU, including the AIU connectors which, without the protective protrusions, could be damaged when the AIU is set down. They can be utilized to stand the AIU off of the ground and/or as handles to facilitate carrying the AIU.

Figure 9:
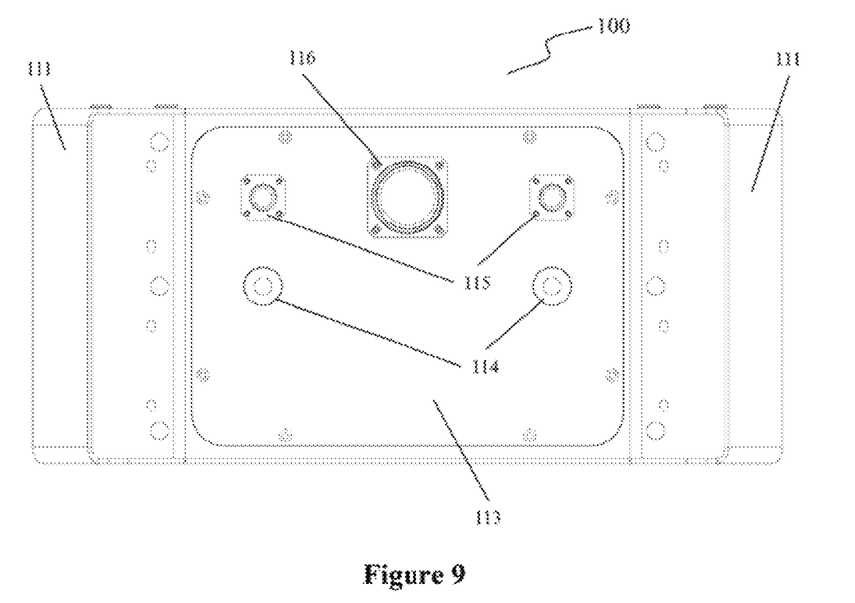
FIG. 9 illustrates an interface panel of an antenna interface unit.
Figure 10:
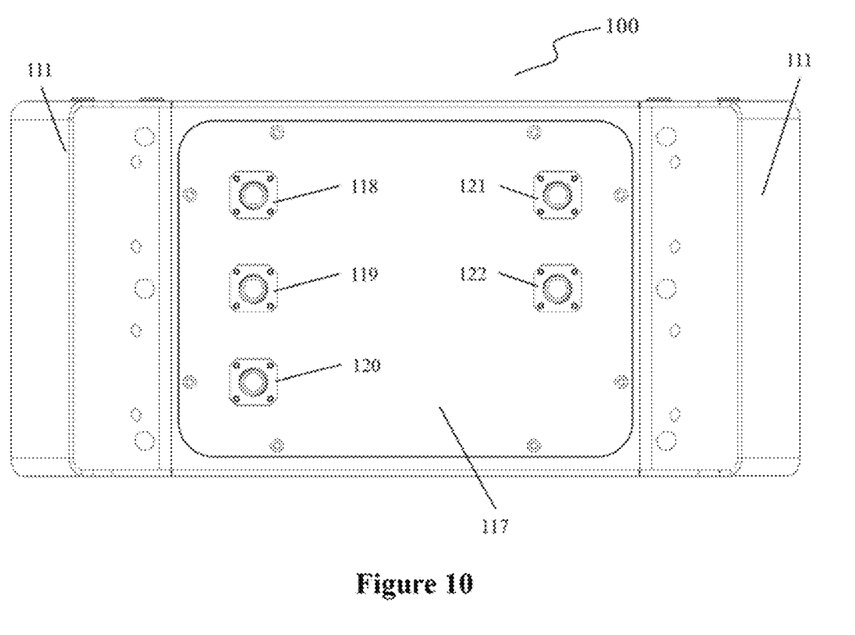
FIG. 10 illustrates an antenna interface panel of an antenna interface unit

FIG. 9 illustrates exemplary details of an interface panel (113) of an AIU. The interface panel can include status indicator lights (114), jacks (115), and an interface port (116) for connecting to a PCU. In some embodiment, the interface panel can include a port for connecting to a high band antenna and a port for connecting to a low band antenna. The panel can include a plurality of Wi-Fi antennae. The AIU can connect to a first Wi-Fi antenna and a second Wi-Fi antenna. The AIU can also include a port for connecting to an antenna for Global Positioning System (GPS) based timing and geolocation. While GPS is given as an example, embodiments can utilize one or more other geolocation satellite systems, such as GLONASS, Galileo, BeiDou-2, and others. The AIU can further include a cable or multi-cable interface connection, for example to facilitate communications with a computer controller. The AIU can include indicator lights, such as power, status, and transmission indicators. The AIU can include one or more cooling vents and/or heatsinks. The vent can be constructed of a sheet of strong material, such as metal or plastic, having a pattern of holes to allow air to vent. The vent also, or alternatively, can include a screen and/or filter. The vents can include high-flow, replaceable filter cartridges. The AIU can include active and/or passive air conditioning. FIG. 10 illustrates an antenna interface panel (117). The antenna interface panel can include jacks for connecting to various antennae. For example, the panel can include a GPS jack (118), a 2.4 GHz jack (119), a 5.8 GHz jack (120), a high band RF jack (121), and a low band RF jack (122).

Multiple receivers and/or antennae can be utilized. For example, several antennae can form an array. Other embodiments can include counter measure systems, in which one or more antennae can be utilized to transmit jamming and/or spoofing signals. Systems can include omnidirectional antennae. Other embodiments can include one or more directional antennae. A directional antenna can enable greater useful range than an omnidirectional antenna, but propagation vectors can affect communication depending on the degree of the antenna's directionality. A directional antenna system can include quasi-omnidirectional antennae, wide-angle directional antennae, and/or holographic antenna systems. An antenna can be coupled to a receiver and/or a transmitter. In some embodiments, both omnidirectional and directional antennae can be utilized. Such systems can include filters, amplifiers, low-noise amplifiers, and analog/digital converters.

A signal analyzer and/or a spatial processor can be coupled to the receiver. The combined PCU and AIU can include signal analyzers. In a preferred embodiment, the PCU can include signal analysis capabilities that can be implemented in software. Signal analysis can be performed remotely, for example within a remote server system and/or cloud-based system, in order to identify the hostile drone. A signal analyzer can perform extraction and classification of signals to, for example, identify the radio signal type, manufacturer, model, operating system, operating states, etc. depending on the signal. A signal analyzer can also determine and distinguish between sUAS and the controller of the sUAS, between multiple sUAS, and between sUAS and other types of aircraft or birds, for example.

Figure 11:
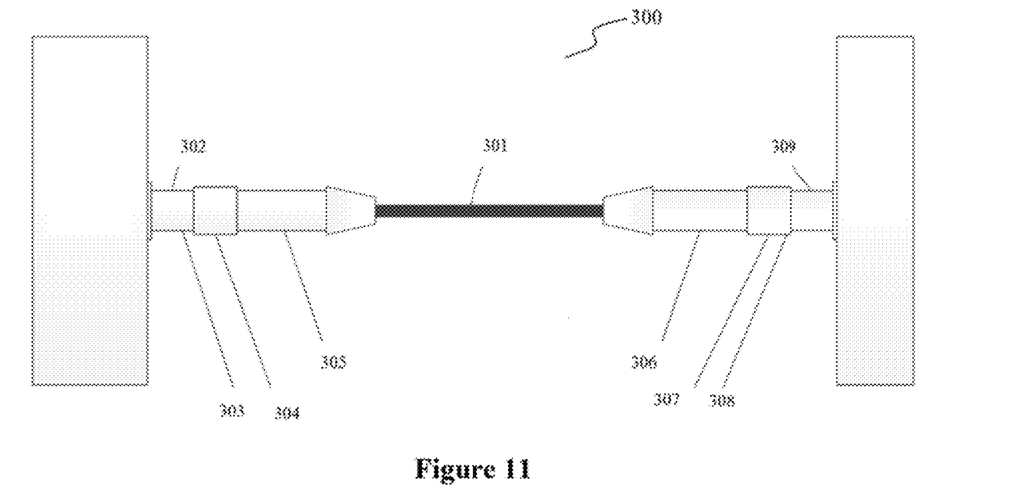
FIG. 11 an interface cable.

FIG. 11 illustrates one example of an interface cable (300). An interface cable can be of various lengths to facilitate on-site configuration of the system. For example, the interface cable can be a meter or two, or the interface cable can be several tens of meters. Connecting the units via the interface cable can allow the AIU to be placed nearer the antennae than the PCU. This can facilitate locating the PCU in a cooler and/or more protected environment than the AIU. Whether the antennae are configured to communicate according to a digital or analog protocol, the electromagnetic waves propagating such communications are themselves necessarily analog in nature. Accordingly, locating the AIU nearer the antennae can also facilitate handling of analog signals at the point of reception or transmission, which can improve signal quality and reduce noise. Further, communication via the interface cable can be digital, either by conversion of analog signals to digital signals by the AIU or by digital signals sent from the PCU to the AIU, whether or not for subsequent conversion to analog.

In the exemplary embodiment of FIG. 11, the cable can include a plurality of cables. For example, in a preferred embodiment, cable (301) can include two #8 coaxial RF connections, two #12 coaxial low bandwidth contacts, a #8 quadraxial Ethernet connector, four power and control pairs with shielding, and an encoder pair at each end. The interface cable can include a processing subsystem terminal (302). The processing subsystem terminal can include a flange mount socket (303), cable mount (304), and a backshell with strain relief (305). The interface cable can include at an antenna subsystem terminal (309). The antenna subsystem terminal can include a backshell with strain relief (306), a cable mount (307), and a flange mount socket (308).

Figure 12:
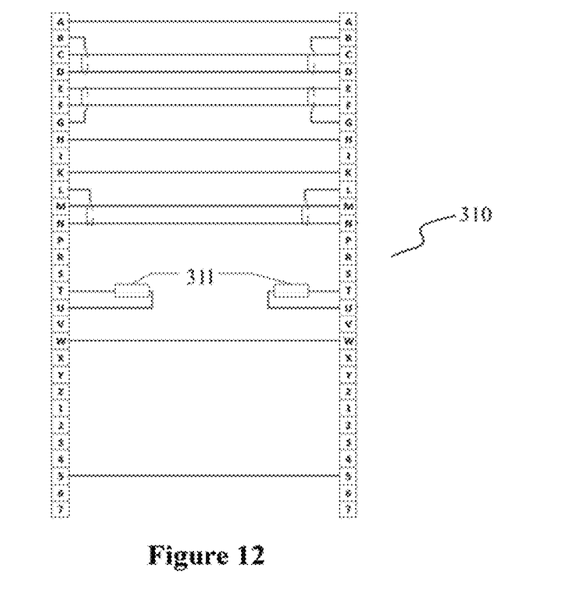
FIG. 12 illustrates an electronic configuration of an interface cable.

FIG. 12 illustrates one of many contemplated wiring configurations of interface cable (310). Shorts and jumps as shown in the figure can be utilized. In this embodiment, A can be an Ethernet connection. C can be a 270 V DC connection, and D can be a 270 V DC return. E can be comms$^+$, and F can be comms$^-$. H can be an RF receive line, and K can be an RF transmit line. M can be a high voltage interlock, and N can be a high voltage interlock return. W can be a 1 PPS signal line. S can be a 10 MHz line. T and U, as shown in the figure, are looped, and do not carry communications from one side to the other. Rather, T and U are each connected to a length resistor (311).

Length resistors can be of particular advantage in certain embodiments. For example, each length resistor (311) can have an electrical resistance of 10 ohms per foot. Accordingly, a 25-foot cable would have an electrical resistance between T and U of 250 ohms. Similarly, a 50-foot cable would have 500 ohms, a 75-foot cable would have 750 ohms, and a 100-foot cable would have 1000 ohms. Other resistances, in fact any useful resistance can be utilized, and 10 ohms per foot is given here only as an example having simple math. Nevertheless, 10 ohms, or approximately 10 ohms, can be an advantageous amount of resistance for cable lengths of 25 to 100 feet. Alternatively, ordinary electrical resistors (i.e. not length resistors) are also contemplated. A key advantage to length resistors in the interface cable is that the system, or subsystems, can utilize the voltage drops across the resistors to measure the length of the cable. The ability of the system to determine the cable length can allow the system to compensate for changes in cable length when switching between cables. For example, systems herein can self-compensate and/or calibrate for time of flight and/or signal loss based on voltage drops across the cable length.

Figure 13:
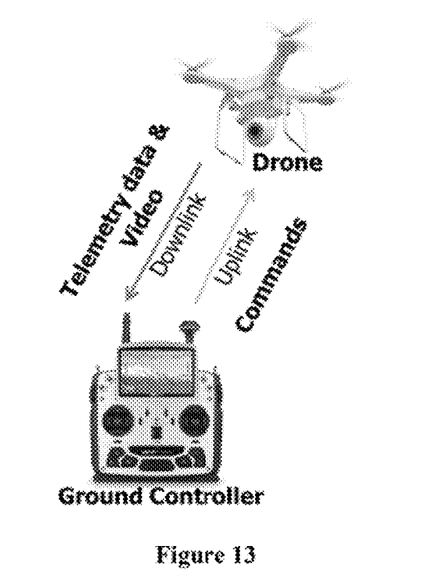
FIG. 13 illustrates an exemplary drone and ground controller communication system.

An exemplary drone and ground controller communication system is shown in FIG. 13. Embodiments can automatically search relevant RF spectra for the presence of known sUAS.

The system can detect the command-and-control (C2) links from a ground controller to the drone (uplink data) and any telemetry and/or payload datalink from the drone to the ground controller (e.g. video).

After sCUAS detection, identification, and location determination, the SDR system, in one embodiment, can deliver various sophisticated non-kinetic, nonattributable RF-based mitigation techniques on a per-target basis. This can provide a defeat effect with minimal collateral damage and/or interference to the ambient RF spectrum. The system can automatically determine the most effective mitigation technique to use against identified targets and can present options to defeat the sCUAS to the operator in a simple manner.

Figure 14:
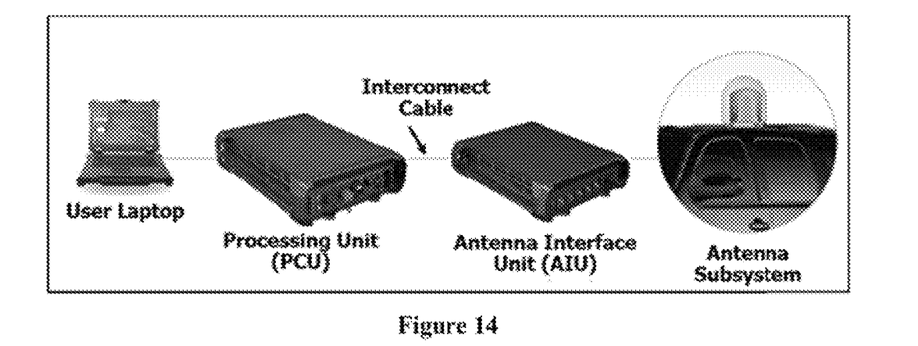
FIG. 14 illustrates exemplary embodiments deployed on vehicles.

Embodiments, as shown in FIG. 14, can be deployed in and/or on vehicles. Embodiments can have reduced size, weight, and power requirements and can be easily deployed in space and power-constrained environments such as in vehicles and/or maritime vessels, providing both ground and maritime convoy protection on the move. For example, embodiments can be installed on a SUV or water vessel. Embodiments can be ruggedized to readily operate when traveling at a speed of 60 miles per hour. As a hostile sUAS enters the detection radius, the system can automatically sense RF energy emitted from the UAS platform and the UAS operator's ground handset and can immediately detect and identify the threat. An alert can be sent to the counter-sUAS operator, for example to a system laptop. The alert can provide information about the specific UAS threat, including precisely detecting, identifying, locating, and tracking the hostile sUAS and locating the sUAS operator. The user can then decide whether to take action to deploy sophisticated non-kinetic, non-attributable countermeasures.

All of the systems disclosed and claimed herein can be made and implemented without undue experimentation in light of the present disclosure. While the apparatus of this invention has been described in terms of preferred embodiments, it will be apparent to those of skill in the art that variations may be applied to the systems and apparatus described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A radio system, comprising:
an antenna interface unit coupled to at least one antenna, wherein the antenna interface unit is configured to receive analog signals, filter the analog signals, and amplify the analog signals;
a processor controller unit coupled to the antenna interface unit, wherein the processor controller unit is configured to receive the analog signals via an interface cable and to convert the analog signals into digital signals;
wherein the interface cable is configured to convey power and a signal selected from the group consisting of a Wi-Fi signal, an Ethernet signal, or an analog RF signal;
wherein the length of the interface cable is automatically calculated by measuring a voltage drop across the interface cable;
wherein signal gain is amplified automatically to compensate for signal power loss across the interface cable in order to optimize the radio system based on cable length;
wherein the interface cable is configured to provide power from the processor controller unit to the antenna interface unit; and
wherein the processor controller unit includes a contactor controller to prevent reverse polarity in the radio system.

2. The radio system according to claim 1, wherein the antenna interface unit further comprises a high band RF conditioning unit and a low band RF conditioning unit.

3. The radio system according to claim 2, wherein the antenna interface unit further comprises two transmission power amps.

4. The radio system according to claim 1, wherein the interface cable is configured to convey analog RF signals.

5. The radio system according to claim 4, wherein the analog RF signal includes a GPS signal.

6. The radio system according to claim 1, further comprising a PCU that performs digital signal processing to analyze signals detected by the AIU.

7. The radio system according to claim 1, wherein the contactor controller further comprises a high voltage regulator.

8. The radio system according to claim 7, wherein the contactor controller further comprises a reverse-biased diode.

9. The radio system according to claim 1, wherein the signal gain is amplified based on the measured voltage drop.

10. The radio system according to claim 1, wherein the processor controller unit comprises a processor control module having RF componentry.

11. The radio system according to claim 10, wherein the RF componentry is isolated from the processor control module by an RF mezzanine.

12. The radio system according to claim 1, wherein the antenna interface unit and the processor controller unit dissipate heat.

13. The radio system according to claim 1, wherein the processor controller unit is configured to receive an AC power supply and to receive a DC power supply.

14. The radio system according to claim 13, wherein the contactor controller is configured to prevent power spikes and power loss within the radio system when switched between the AC power supply and the DC power supply.

15. A radio system, comprising:
an antenna interface unit coupled to at least one antenna, wherein the antenna interface unit is configured to receive analog signals, filter the analog signals, and amplify the analog signals;
a processor controller unit coupled to the antenna interface unit, wherein the processor controller unit is configured to receive the analog signals via an interface cable and to convert the analog signals into digital signals;
wherein the interface cable is configured to convey power and a signal selected from the group consisting of a Wi-Fi signal, an Ethernet signal, or an analog RF signal;
wherein the length of the interface cable is automatically calculated;
wherein signal gain is amplified automatically to compensate for signal power loss across the interface cable in order to optimize the radio system based on cable length;

wherein the interface cable is configured to provide power from the processor controller unit to the antenna interface unit;

wherein the processor controller unit includes a contactor controller to prevent reverse polarity in the radio system; and wherein the processor control unit comprises a processor control module, an RF mezzanine, a main motherboard having a central processing unit, and SSD memory.

16. The radio system according to claim 15, wherein the processor controller unit further comprises a server motherboard and subsystems for signal reception, analog-to-digital conversion, digital-to-analog conversion, and one or more Ethernet switches.

17. The radio system according to claim 16, wherein the antenna interface unit and the processor controller unit each dissipate heat.

18. A radio system, comprising:

an antenna interface unit coupled to at least one antenna, wherein the antenna interface unit is configured to receive analog signals, filter the analog signals, and amplify the analog signals;

a processor controller unit coupled to the antenna interface unit, wherein the processor controller unit is configured to receive the analog signals via an interface cable and to convert the analog signals into digital signals;

wherein the interface cable is configured to convey power and a signal selected from the group consisting of a Wi-Fi signal, an Ethernet signal, or an analog RF signal;

wherein the length of the interface cable is automatically calculated;

wherein signal gain is amplified automatically to compensate for signal power loss across the interface cable in order to optimize the radio system based on cable length;

wherein the interface cable is configured to provide power from the processor controller unit to the antenna interface unit;

wherein the processor controller unit includes a contactor controller to prevent reverse polarity in the radio system;

wherein the processor controller unit comprises a processor control module having RF componentry; and wherein the RF componentry is isolated from the processor control module by an RF mezzanine.

19. A radio system, comprising:

an antenna interface unit coupled to at least one antenna, wherein the antenna interface unit is configured to receive analog signals, filter the analog signals, and amplify the analog signals;

a processor controller unit coupled to the antenna interface unit, wherein the processor controller unit is configured to receive the analog signals via an interface cable and to convert the analog signals into digital signals;

wherein the interface cable is configured to convey power and a signal selected from the group consisting of a Wi-Fi signal, an Ethernet signal, or an analog RF signal;

wherein the length of the interface cable is automatically calculated;

wherein signal gain is amplified automatically to compensate for signal power loss across the interface cable in order to optimize the radio system based on cable length;

wherein the interface cable is configured to provide power from the processor controller unit to the antenna interface unit;

wherein the processor controller unit includes a contactor controller to prevent reverse polarity in the radio system;

wherein the processor controller unit is configured to receive an AC power supply and to receive a DC power supply; and wherein the contactor controller is configured to prevent power spikes and power loss within the radio system when switched between the AC power supply and the DC power supply.

* * * * *